(12) United States Patent
Ui et al.

(10) Patent No.: US 8,584,203 B2
(45) Date of Patent: Nov. 12, 2013

(54) IDENTIFIER AUTHENTICATING SYSTEM

(75) Inventors: Takaharu Ui, Tokyo (JP); Toshihide Uotani, Tokyo (JP); Shin Yoshimura, Tokyo (JP); Hiroshi Takada, Tokyo (JP)

(73) Assignees: Japan Registry Services, Co., Ltd., Tokyo (JP); Shin Yoshimura, Tokyo (JP)

( * ) Notice: Subject to any disclaimer, the term of this patent is extended or adjusted under 35 U.S.C. 154(b) by 1217 days.

(21) Appl. No.: 12/225,103

(22) PCT Filed: Nov. 30, 2006

(86) PCT No.: PCT/JP2006/323945
§ 371 (c)(1),
(2), (4) Date: Sep. 12, 2008

(87) PCT Pub. No.: WO2007/105342
PCT Pub. Date: Sep. 20, 2007

(65) Prior Publication Data
US 2009/0106259 A1    Apr. 23, 2009

(30) Foreign Application Priority Data

Mar. 14, 2006   (JP) ................... 2006-069931

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |

(52) U.S. Cl.
USPC ............. 726/3; 726/27; 726/28; 726/29

(58) Field of Classification Search
USPC .................................. 726/2–7, 9, 27–30
See application file for complete search history.

(56) References Cited

U.S. PATENT DOCUMENTS 7,076,258 B2 *   7/2006   Motegi et al. ............. 455/456.1
(Continued)

FOREIGN PATENT DOCUMENTS

| JP | 2004-134954 | 4/2004 |
|---|---|---|
| JP | 2004-234059 | 8/2004 |

OTHER PUBLICATIONS

Y. Yamauchi et al., "Domain Name Service Settei no Kihon no Saikakunin to Ssaikin no Doko eno Taio o Kangaeru 3 DNS no Shikumi", Open Design vol. 8, No. 11, CQ Publishing Co., Ltd., Nov. 1, 2001, pp. 15-16, Fig. 1.3.

(Continued)

*Primary Examiner* — Kambiz Zand
*Assistant Examiner* — Jing Sims
(74) *Attorney, Agent, or Firm* — Clark & Brody

(57) ABSTRACT

There is provided an identifier authenticating system in which information requesting users can share all predetermined information held in a plurality of information providing servers. In the identifier authenticating system, when an identifier holding user 18 presents an identifier to an information requesting server 16, the information requesting server 16 asks a location managing server 14 about a location of an information providing server 15; the location managing server 14 returns a confirmed IP address of the information providing server 15 to the information requesting server 16 based on the location information; and the information requesting server 16 uses the confirmed IP address to access the information providing server 15 corresponding to the confirmed IP address and receives predetermined information specified by multiplying n pieces of identification information from the accessed information providing server.

7 Claims, 6 Drawing Sheets

(56) References Cited

U.S. PATENT DOCUMENTS

| | | | |
|---|---|---|---|
| 2002/0073335 A1* | 6/2002 | Shuster | 713/201 |
| 2003/0208562 A1* | 11/2003 | Hauck et al. | 709/219 |
| 2004/0243835 A1* | 12/2004 | Terzis et al. | 713/200 |
| 2005/0039045 A1* | 2/2005 | Wheeler | 713/201 |
| 2007/0022469 A1* | 1/2007 | Cooper et al. | 726/3 |
| 2007/0226807 A1* | 9/2007 | Ginter et al. | 726/27 |

OTHER PUBLICATIONS

M. Arai, "DNS no Cache Cache no Yuko Kigen", UNIX Magazin, vol. 20, No. 12, Ascii Corp., Dec. 1, 2005, pp. 71-80.

T. Yokoyama, "Sawatte Wakaru DNC no Kiso Dai 1 Kai DNS towa Donna Shikumi Daro", Nikkei Windows Pro, No. 85, Nikkei Business Publications, Inc., Apr. 1, 2004, pp. 150-157.

\* cited by examiner

IDENTIFIER AUTHENTICATING SYSTEM

TECHNICAL FIELD

The present invention relates to an identifier authenticating system in which predetermined information held in a plurality of information providing servers can be shared.

BACKGROUND ART

There is an information network system in which an information providing server installed in an information providing company is connected with an information terminal installed for an information requesting user that receives information through a network (see Patent Document 1). The information providing server has information storing means for storing information from an information providing user that provides the information to the information providing server or information from the information requesting user, and information transmitting means for transmitting information. The information terminal has a display unit that displays information provided from the information providing server, and information receiving means for receiving information from the information providing server. In the information network system, when contents of information held in the information providing server are updated or new information is transmitted to the information providing server from the information providing user, the contents of the information will be displayed at a predetermined position in the display unit of the information terminal. According to this system, updated information or new information can be confirmed by just seeing the display unit of the terminal without operating the information terminal by the information requesting user.
Patent Document 1: Japanese Unexamined Patent Publication (Kokai) No. 2004-134954

DISCLOSURE OF THE INVENTION

Problem to be Solved by the Invention

The information network system disclosed in the patent publication is a proprietary private network and also a closed network set in one region or at one point, and hence any user other than the information requesting users in this network cannot access this network. In this information network system, only the information requesting users in the private network can share information, and any user other than the information requesting users in the private network cannot utilize information held in the information providing server of this network. When a user other than the information requesting users who are currently using this information network system utilizes this system, a network must be newly configured in the private network.

An object of the present invention is to provide an identifier authenticating system in which information requesting users can share all the predetermined information held in a plurality of information providing server.

Means for Solving the Problem

A premise of the present invention for solving the aforementioned problems is achieved by an identifier authenticating system in which an information providing server that stores predetermined information and an information requesting server that requests the information providing server to provide the predetermined information form each of a plurality of independent private networks, and presenting a predetermined identifier to the information requesting server by an identifier holding user having the identifier given from the information providing server enables providing the predetermined information to the information requesting server from the information providing server.

The present invention in the premise is characterized in that the system is provided with a location management server that unifies management of the location information of the information providing servers, the predetermined information is stored in the information providing server, and the information providing server specifies predetermined information by multiplying n pieces of identification information including an identifier. In this identifier authenticating system, when the identifier holding user presents an identifier to the information requesting server, the information requesting server asks the location management server about a location of the information providing server, the location management server returns confirmed location information of the information providing server to the information requesting server based on the location information, and the information requesting server uses the confirmed location information to access the information providing server corresponding to the confirmed location information and receives predetermined information specified by multiplying n pieces of identification information from the accessed information providing server.

As one example of the present invention, the location management server is divided into a highest first location management server to a lowest k-th location management server, the first to k-th location management servers and the information providing server form a tree structure which branches into a plurality of paths starting from the first location management server toward the k-th location management server and from the k-th location management server toward the information providing server, and the confirmed location information of the information providing server is registered on any one of a plurality of k-th location management servers. In this identifier authenticating system, when the information requesting server asks the first location management server about a location of the information providing server, the first location management server returns confirmed location information of a second location management server immediately lower than that to the information requesting server based on the location information, and when the information requesting server accesses the second location management server corresponding to the returned confirmed location information and asks the accessed second location management server about the location of the information providing server, the second location management server returns confirmed location information of a third location management server immediately lower than that to the information requesting server based on the location information, and the information providing server is retrieved by repeating an inquiry and a response between the location management servers and the information requesting server starting from the first location management server toward the k-th location management server in this manner.

As another example of the present invention, In the identifier authenticating system in which when the confirmed location information of the location management server and the confirmed location information of the information providing server that have been returned based on the retrieval of location in the past are stored in the information requesting server, the identifier authenticating system omits retrieval of the location management servers higher than the location management server that stores the confirmed location information stored in the information requesting server, and when retrieval of the location management servers lower than the location management server immediately lower than the location management server that stores the confirmed location information and the information providing server is needed, it retrieves the information providing server by repeating an inquiry and a response between the location management servers and the information requesting server starting from the location management server immediately lower than the location management server that stores the confirmed location information toward the lower servers.

As still another example of the present invention, storage times of the confirmed location information of the location management server and the confirmed location information of the information providing server that have been returned based on the retrieval of location in the past are set in the information requesting server, and when the storage time of the confirmed location information elapses, the information requesting server erases the stored confirmed location information of the location management server and confirmed location information of the information providing server.

As yet still another example of the present invention, the information requesting server can arbitrarily erase the confirmed location information of the location management server and the confirmed location information of the information providing server that are stored in the information requesting server and have been returned based on the retrieval of location in the past.

As yet still another example of the present invention, in the system, a presentation-time when the identifier is presented to the information requesting server is transmitted from the information requesting server to the information providing server, and when the information providing server determines that the presentation-time of the identifier exceeds a set time, it stops providing predetermined information to the information requesting server.

As yet still another example of the present invention, the information providing servers, the information requesting servers, and the location management servers are connected with each other through the Internet, and a series of processes including the inquiry of the location of the information providing server to the location management server, the response of the confirmed location information from the location management server to the information requesting server, the request of predetermined information from the information requesting server to the information providing server, and the provision of the predetermined information from the information providing server to the information requesting server are executed through the Internet in this identifier authenticating system.

Effect of the Invention

According to the identifier authenticating system in accordance with the present invention, the information requesting servers (information requesting users) can share all the predetermined information held in each of the information providing servers, and the information requesting users can easily obtain the predetermined information stored in the information providing servers. In the system, the location management server unifies management of the location information of all the information providing servers, and the location management server responds to an inquiry of the confirmed location information of the information providing server, so that the information requesting server can access all the information providing servers, thus allowing the information requesting user to receive each predetermined information from all the information providing servers. In the system, since various kinds of predetermined information are specified by multiplying a plurality of pieces of identification information, various kinds of predetermined information can be arbitrarily set by the identification information, various identifier authentication services can be received by this one system.

According to the identifier authenticating system in which the information providing server is retrieved by repeating an inquiry and a response between the location management servers and the information requesting server, the location management server is divided into a highest first location management server to a lowest k-th location management server, a plurality of location management servers hierarchically and decentrally manages the location information of the information providing servers, so that a load on the location management server can be reduced, as compared with the case where single location management server manages the location information of the information providing servers. Even when the location information of a plurality of information providing servers is registered on the location management server, this system can avoid the location management server from falling into an overload.

The retrieval of the location management servers higher than the location management server that stores the confirmed location information stored in the information requesting server is omitted, and when retrieval of the location management servers lower than the location management server immediately lower than the location management server that stores the confirmed location information and the information providing server is needed, an inquiry and a response is repeated between the location management server and the information requesting server starting from the location management server immediately lower than the location management server which stores the confirmed location information toward the lower servers, so that the identifier authenticating system is not required to repeat the retrieval of the information providing server from the first location management server, thus allowing the information providing servers to be retrieved quickly. This system can eliminate a load on the location management servers higher than the location management server which stored the confirmed location information.

In the identifier authenticating system in which the memorized confirmed location information of the location management server and confirmed location information of the information providing server are erased when the storage time of the confirmed location information elapses, even when the information requesting server stores the confirmed location information thereof, and then the location information of the location management server and the location information of the information providing server corresponding to the confirmed location information are changed, the system can be coped with it, thus allowing the location of the information providing server to be retrieved accurately. It is to be noted that when the stored confirmed location information is erased after the predetermined period has elapsed, retrieval of the information providing server is performed by repeating an inquiry and a response between the location management servers and the information requesting server starting from the first location management server toward the k-th location management server.

In the identifier authenticating system in which the confirmed location information and the confirmed location information of the information providing server of the location management server stored in the information requesting server can be arbitrarily erased, even when the information requesting server stores the confirmed location information thereof, and then the location information of the location management server and the location information of the information providing server corresponding to the confirmed location information are changed, the system can be coped with it, thus allowing the location of the information providing server to be retrieved accurately. It is to be noted that when the stored confirmed location information is arbitrarily erased, retrieval of the information providing server is performed by repeating an inquiry and a response between the location management servers and the information requesting server starting from the first location management server toward the k-th location management server.

In the identifier authenticating system in which when the presentation-time of the identifier to the information requesting server exceeds the set time, provision of the predetermined information to the information requesting server is stopped, it can prevent the identifier from unauthorized use by persons other than the identifier holding user, thus allowing to prevent the information on the identifier holding users from fraudulently flowing out.

In the identifier authenticating system in which the information providing servers, the information requesting servers, and the location management servers are connected with each other through the Internet, and a series of processes including the inquiry of the confirmed location information, the response of the confirmed location information, and the request and provision of the predetermined information are executed through the Internet, the predetermined information held in these information providing servers can be shared by utilizing the Internet, and anyone can obtain anywhere easily the predetermined information stored in the information providing servers if there is an Internet connection environment. According to the system, all the predetermined information held in a plurality of information providing servers can be shared by utilizing the Internet which is an existing public communication network, so that various identifier authentication services can be received without being limited to specific identifier authentication services.

EXPLANATIONS OF LETTERS OR NUMERALS

Figure 1:
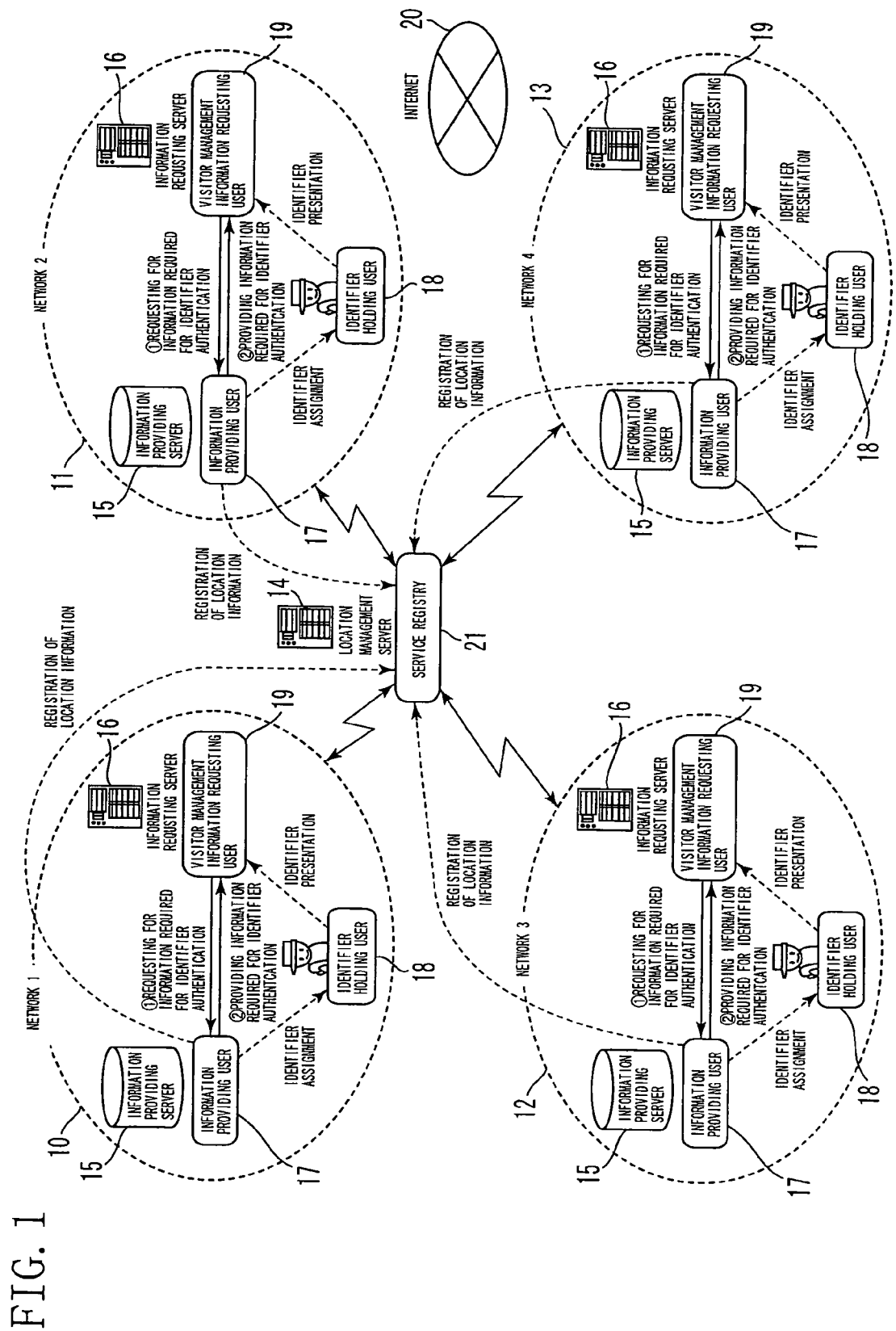
FIG. 1 is a conceptual view of an identifier authenticating system.

10: private network
11: private network
12: private network
13: private network
14: location management server
14A to 14C: first location management server
15: information providing server
15A to 15D: information providing server
16: information requesting server
16A to 16D: information requesting server
17: information providing user
17A to 17D: information providing user
18: identifier holding user
18A to 18F: identifier holding user
19: information requesting user
19A to 19D: information requesting user
20: Internet
21: registry operator
22: IC card
23: IC card
24: ID number (identifier)
25: information disclosure level
26: time
27: IC card
28: IC card
29: IC card
30: IC card
31: ID number (identifier)
32: ID number (identifier)
33: information disclosure level

BEST MODE(S) FOR CARRYING OUT THE INVENTION

Figure 2:
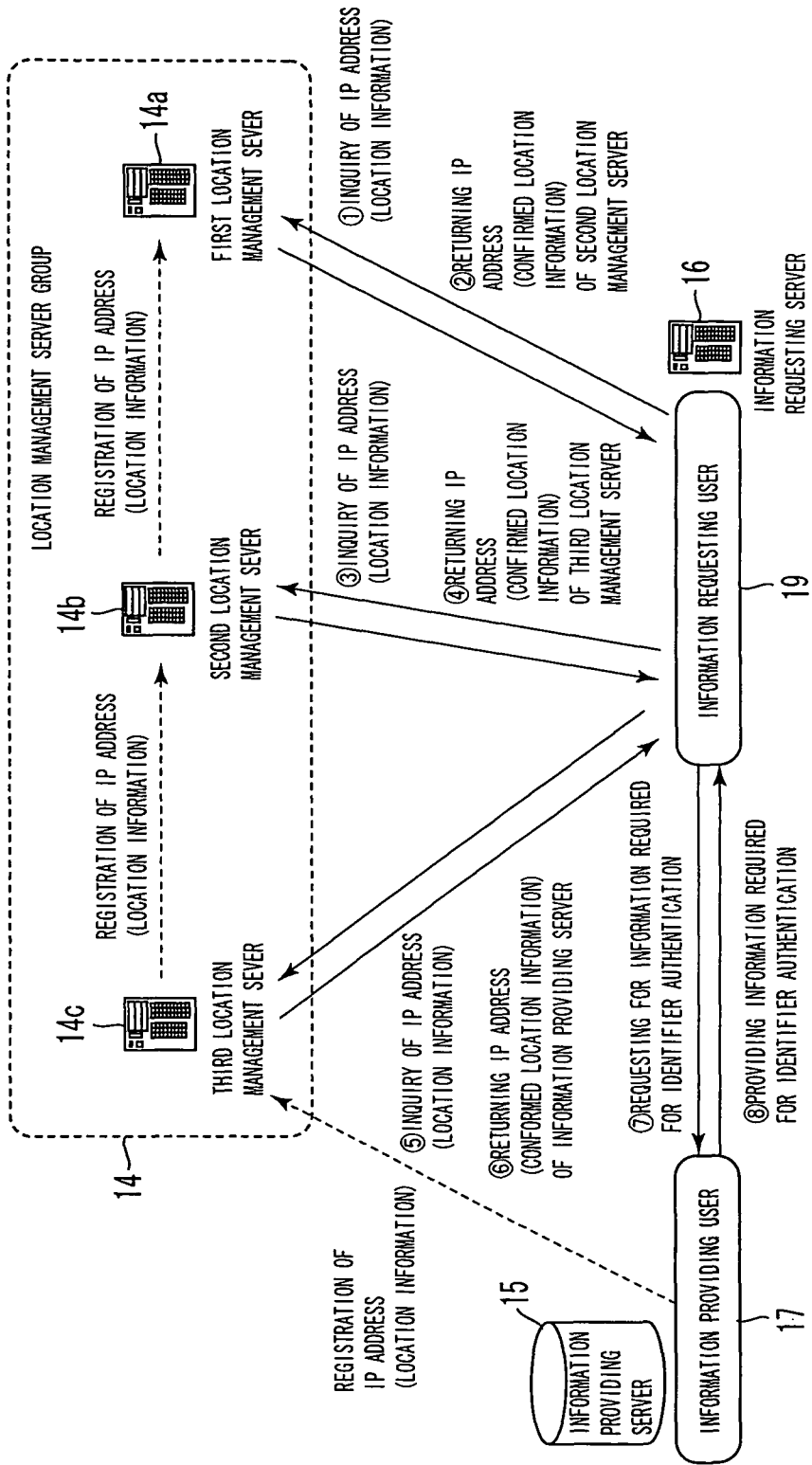
FIG. 2 is view showing one example of a procedure for retrieving a confirmed IP address of an information providing server.

Details of an identifier authenticating system according to the present invention will now be described as follows with reference to the accompanying drawings. FIG. 1 is a conceptual diagram of the identifier authenticating system shown as one example. FIG. 2 is a view showing one example of a retrieval procedure of a confirmed IP address of the information providing server 15 performed between location management servers 14A to 14C, and an information requesting server 16. The identifier authenticating system is configured by a plurality of private networks 10, 11, 12, and 13, and a location management server 14 that unifies management of location information of the later-explained information providing servers 15.

Each of the private networks 10, 11, 12, and 13 is formed of the information providing server 15 that holds predetermined information, and the information requesting server 16 that requests the information providing server 15 to provide the predetermined information. The information providing server 15 is managed by an information providing user 17 that provides predetermined information, and gives a predetermined identifier which is one of the identification information to an identifier holding user 18. The information requesting server 16 is managed by an information requesting user 19 that requests the information providing user 17 to provide the predetermined information. In each of the private networks 10, 11, 12, and 13, when the identifier holding user 18 that has the predetermined identifier provided from the information providing server 15 presents the identifier to the information requesting server 16, predetermined information corresponding to the presented identifier is provided to the information requesting server 16 from the information providing server 15. Note herein that, while one information providing server 15 and one information requesting server 16 are shown in each of the private networks 10, 11, 12, and 13 in FIG. 1, a plurality of information providing servers 15 and a plurality of information requesting servers 16 actually present in each of the private networks 10, 11, and 12 and 13.

Each of the private networks 10, 11, 12, and 13 is a system that grants authority to the identifier holding user 18 when the identifier holding user 18 presents the identifier to the information requesting server 16, and has an Authentication, Authorization, Accounting (AAA) security function. Each of the private networks 10, 11, 12, and 13 may confirm (authenticate) a specific identifier holding user 18 to then grant appropriate authority to the confirmed identifier holding user 18 in some cases (management control), and further preserves all kinds of records to monitor presence/absence of problems (audit). The authentication examines and determines validity of the identifier holding user 18. Authenticating means, such as an ID number, a password, an IC card, biometrics, or the like can be used for the authentication. The management control grants appropriate authority to the valid identifier holding user 18 according to authority provided with respect to each of the private networks 10, 11, 12, and 13. The audit preserves records describing what kind of authority is granted to an identifier and when, and how the authority has been used, thereby making it possible to examine these histories. As described above, each of these private networks 10, 11, 12, and 13 is a closed network constructed in one region or one site, and thus it cannot provide the information held in the information providing server 15 to any information requesting server 16 other than the information requesting servers 16 of the private network to which it belongs if it remains as it is. In this system, however, a plurality of information providing servers 15 and a plurality of information requesting servers 16, and the location management server 14 that unifies management of the location information of these information providing servers 15 are connected with each other through the Internet 20, and an open network is formed of these servers 14, 15, and 16 as shown in FIG. 1, and all the information requesting servers 16 can share all the predetermined information held in all the information providing servers 15 in the private networks 10, 11, 12, and 13.

The location management server 14 is managed by, for example, an operator that carries out registry business of domain names or an operator (a service registry 21) that manages registration of domain names, or the like. The location management server 14 is a computer having a high-capacity hard disk mounted thereon, and is connectable with the Internet 20. Although not shown, a keyboard, a printer, or a display is connected with the location management server 14 through interfaces. The location management server 14 is formed of a plurality of location management server groups, and these server groups are divided into a highest-level first location management server (a root server) to a lowest-level k-th location management server. The location management servers 14 and the information providing server 15 form a pyramidal structure in which the first location management server is the top of them, and the servers are spread from the first location management server toward the k-th location management server, and further from the k-th location management server toward the information providing server. The location management servers 14 and the information providing server 15 form a tree structure which branches into a plurality of paths from the first location management server toward the k-th location management server, and further from the k-th location management server toward the information providing server. Incidentally, although the drawing is omitted, there are a plurality of first to k-th location management servers. Here, the k-th location management server may be the first location management server or a third location management server in some cases, or may be a fifth location management server or a 10th location management server in some cases.

IP addresses (location information) of each of the information providing servers 15 are hierarchically and decentrally registered on these location management servers 14. Namely, the confirmed IP address of the information providing server 15 (confirmed location information) is registered on any one of the predetermined k-th location management servers that are higher by one hierarchy than those, and the confirmed IP address (confirmed location information) of the k-th location management server is registered on any one of the predetermined (k-1)th location management servers that are higher by one hierarchy than those. Similarly, the confirmed IP addresses (confirmed location information) of the third to (k-1)th location management servers are registered on any one of the predetermined second to (k-2)th location management servers that are higher by one hierarchy than those, respectively, and the confirmed IP address (confirmed location information) of the second location management server is registered on any one of the predetermined first location management servers that are higher by one hierarchy than those. As described above, the confirmed IP addressed (confirmed location information) of the information providing server 15 and the second to k-th location management servers are hierarchically registered on these location management servers 14 so as to track back from the k-th location management server to the first location management server. As one example of registering the IP address of the information providing server 15 on the location management server 14, the information providing user 17 transmits an electronic document on which the IP address are written to the location management server 14 of a service registry operator 21 through the Internet 20 (electronic registration) Alternatively, the registration is performed by presenting a document on which the IP address is written to the service registry operator 21 (document registration).

The information providing server 15 and the information requesting server 16 are computers having high-capacity hard disks mounted thereon, and can be connected with the Internet 20. Although not shown, a keyboard, a printer, or a display is connected with each of the servers 15 and 16 through an interface. The predetermined information is stored in the information providing server 15. The information providing server 15 specifies the predetermined information by multiplying n pieces of identification information.

When the identifier holding user 18 presents the given identifier to the information requesting server 16, the information requesting server 16 asks the location management server 14 about a location of the information providing server 15. The location management server 14 returns the confirmed IP address (confirmed location information) of the information providing server 15 to the information requesting server 16 based on the IP address (location information) stored therein. The information requesting server 16 uses the confirmed IP address returned from the location management server 14 to access the information providing server 15 corresponding to the confirmed IP address, and receives the predetermined information specified by multiplying n pieces of identification information from the accessed information providing server 15.

One example of a retrieval procedure of the information providing server 15 when the information requesting server 16 asks the location management server 14 about a location of the information providing server 15 will be described as follows based on FIG. 2. The third location management server 14C shall be the k-th location management server in the description of this retrieval procedure. Incidentally, the location management servers 14B and 14C have registered their own IP addresses on the location management servers 14A and 14B that are immediately higher than those, respectively. The location management servers 14B and 14C are managed by the immediately higher location management servers 14A and 14B based on the registered IP addresses, respectively. The higher level location management servers manage only the IP address of the location management server immediately lower than those, but do not manage the IP addresses of the location management servers other than and lower than the location management server immediately lower than those, respectively.

The location management servers 14A, 14B, and 14C, the information providing server 15, and the information requesting server 16 are connected with the Internet 20. When the identifier holding user 18 presents the identifier to the information requesting server 16, the information requesting server 16 asks the first location management server 14A about a location of the information providing server 15. The first location management server 14A retrieves a confirmed IP address (confirmed location information) of the second location management server 14B, and returns a retrieved IP address of the second location management server 14B to the information requesting server 16. The retrieved second location management server 14B among a plurality of second location management servers which lie in a tree structure from the first location management server 14A is connected with the third location management server 14C (k-th location management server) that stores the confirmed IP address (confirmed location information of the information providing server 15) of the information providing server 15.

When the confirmed IP address of the second location management server 14B is returned to the information requesting server 16, the information requesting server 16 accesses the second location management server 14B based on the IP address to ask the accessed second location management server 14B about a location of the information providing server 15. The second location management server 14B retrieves a confirmed IP address (confirmed location information) of the third location management server 14C, and returns a retrieved IP address of the third location management server 14C to the information requesting server 16. When the confirmed IP address of the third location management server 14C is returned to the information requesting server 16, the information requesting server 16 accesses the third location management server 14C based on the IP address to ask the accessed third location management server 14C about a location of the information providing server 15. The third location management server 14C retrieves a confirmed IP address (confirmed location information) of the information providing server 15, and returns a retrieved IP address of the information providing server 15 to the information requesting server 16.

As described above, the information providing server 15 is retrieved by repeating an inquiry and a response between the location management servers 14A, 14B, and 14C, and the information requesting server 16 starting from the first location management server 14A toward the third location management server 14C (k-th location management server). When the confirmed IP address of the information providing server 15 is returned to the information requesting server 16, the information requesting server 16 accesses the information providing server 15 having that IP address, and requests the accessed information providing server 15 to provide predetermined information for authentication. The information providing server 15 provides the information requesting server 16 with the predetermined information specified by multiplying n pieces of identification information in proportion to the request of the information requesting server 16.

It is to be noted that a series of processes including the inquiry of the location of the information providing server 15 to the first location management server 14A, the response of the confirmed IP address of the second location management server 14B from the first location management server 14A to the information requesting server 16, the inquiry of the location of the information providing server 15 to the second location management server 14B, the response of the confirmed IP address of the third location management server 14C from the second location management server 14B to the information requesting server 16, the inquiry of the location of the information providing server 15 to the third location management server 14C, the response of the confirmed IP address of the information providing server 15 from the third location management server 14C to the information requesting server 16, the request of the predetermined information from the information requesting server 16 to the information providing server 15, and the provision of the predetermined information specified by multiplying n pieces of identification information from the information providing server 15 to the information requesting server 16 are executed through the Internet 20.

The information requesting server 16 stores the confirmed IP address of the location management server 14 that has been returned based on the retrieval of location in the past, and also stores the confirmed IP address of the information providing server 15 that has been returned based on the retrieval of location in the past. The system omits retrieval of location management servers higher than the location management server that stores the confirmed IP address stored in the information requesting server 16 among those location management servers 14A, 14B, and 14C. Meanwhile, when retrieval of the location management servers lower than the location management server immediately lower than the location management server that stores the confirmed IP address and the information providing server 15 is needed, the information providing server 15 is retrieved by repeating an inquiry and a response between the location management server 14 and the information requesting server 16 starting from the location management server immediately lower than the location management server that stores the confirmed IP address toward the lower location management servers. The retrieved information providing server 15 provides the information requesting server 16 with the predetermined information specified by multiplying n pieces of identification information.

For example, when the confirmed IP address of the information providing server 15 that has been returned based on the retrieval of location in the past is registered on the specific third location management server 14C and the information requesting server 16 stores the confirmed IP address, and without repeating an inquiry and a response between the location management servers 14A, 14B, and 14C, and the information requesting servers 16 starting from the first location management server 14A toward the third location management server 14C, the information providing server 15 is immediately requested to provide the predetermined information based on the confirmed IP address of the information providing server 15 stored in the information requesting server 16.

Meanwhile, when the confirmed IP address of the second location management server 14B that has been returned based on the retrieval of location in the past is registered on the specific first location management server 14A, and the information requesting server 16 stores that confirmed IP address, the location management server 14B is requested to return the confirmed IP address of the information providing server 15 based on the confirmed IP address of the second location management server 14B stored in the information requesting server 16, without repeating an inquiry and a response between the first location management server 14A and the information requesting servers 16. In this case, retrieval of the IP address of the third location management server 14C lower than the confirmed IP address registered on the second location management server 14B is required, so that the information providing server 15 is retrieved by repeating an inquiry and a response between the location management servers 14B and 14C, and the information requesting server 16 starting from the second location management server 14B immediately lower than the first location management server 14A toward the lower servers. The retrieved information providing server 15 provides the information requesting server 16 with the predetermined information specified by multiplying n pieces of identification information.

Storage times of the confirmed IP address of the location management server 14 and the confirmed IP address of the information providing server 15 that have been returned based on the retrieval of location in the past are set in the information requesting server 16. It is preferable for the storage time to be set every several days, several weeks, or several months. Incidentally, it can be set to zero second. When the storage time elapses, the information requesting server 16 erases the confirmed IP address of the location management server 14 and the confirmed IP address of the information providing server 15 stored therein. It is to be noted that when the confirmed IP address is erased, and thereafter the identifier holding user 18 presents the identifier to the information requesting server 16, retrieval of the information providing server 15 is started from the first location management server. Namely, the information providing server 15 is retrieved by repeating the inquiry and the response between the location management server 14 and the information requesting servers 16 starting from the first location management server toward the k-th location management server, and thus the retrieved information providing server 15 provides the information requesting server 16 with the predetermined information specified by multiplying n pieces of identification information.

The information requesting server 16 can arbitrarily erase the confirmed IP address of the location management server 14 and the confirmed IP address of the information providing server 15 that are stored therein and have been returned based on the retrieval of location in the past. As one example for it, when a predetermined time elapses after storing the confirmed IP address, the information requesting server 16 determines whether or not the confirmed IP address of the location management server 14 or the information providing server 15 is changed. In this case, the information requesting server 16 uses the confirmed IP address to access the location management server 14 or the information providing server 15 corresponding to the IP address, but when the access is invalid, it determines that the confirmed IP address has been changed to then erase the stored IP addresses. It is to be noted that when the confirmed IP address is arbitrarily erased, and thereafter the identifier holding user 18 presents the identifier to the information requesting server 16, retrieval of the information providing server 15 is started from the first location management server. Namely, the information providing server 15 is retrieved by repeating the inquiry and the response between the location management server 14 and the information requesting servers 16 starting from the first location management server toward the k-th location management server, and thus the retrieved information providing server 15 provides the information requesting server 16 with the predetermined information specified by multiplying n pieces of identification information.

The information requesting server 16 counts a presentation-time that an identifier is presented to the information requesting server 16, and transmits the counted presentation-time to the information providing server 15. When the presentation-time of the identifier exceeds a set time, the information providing server 15 stops providing the predetermined information to the information requesting server 16. The set time is stored in the information providing server 15, and it is preferably within 1 minute, and more preferably within 10 seconds.

Figure 3:
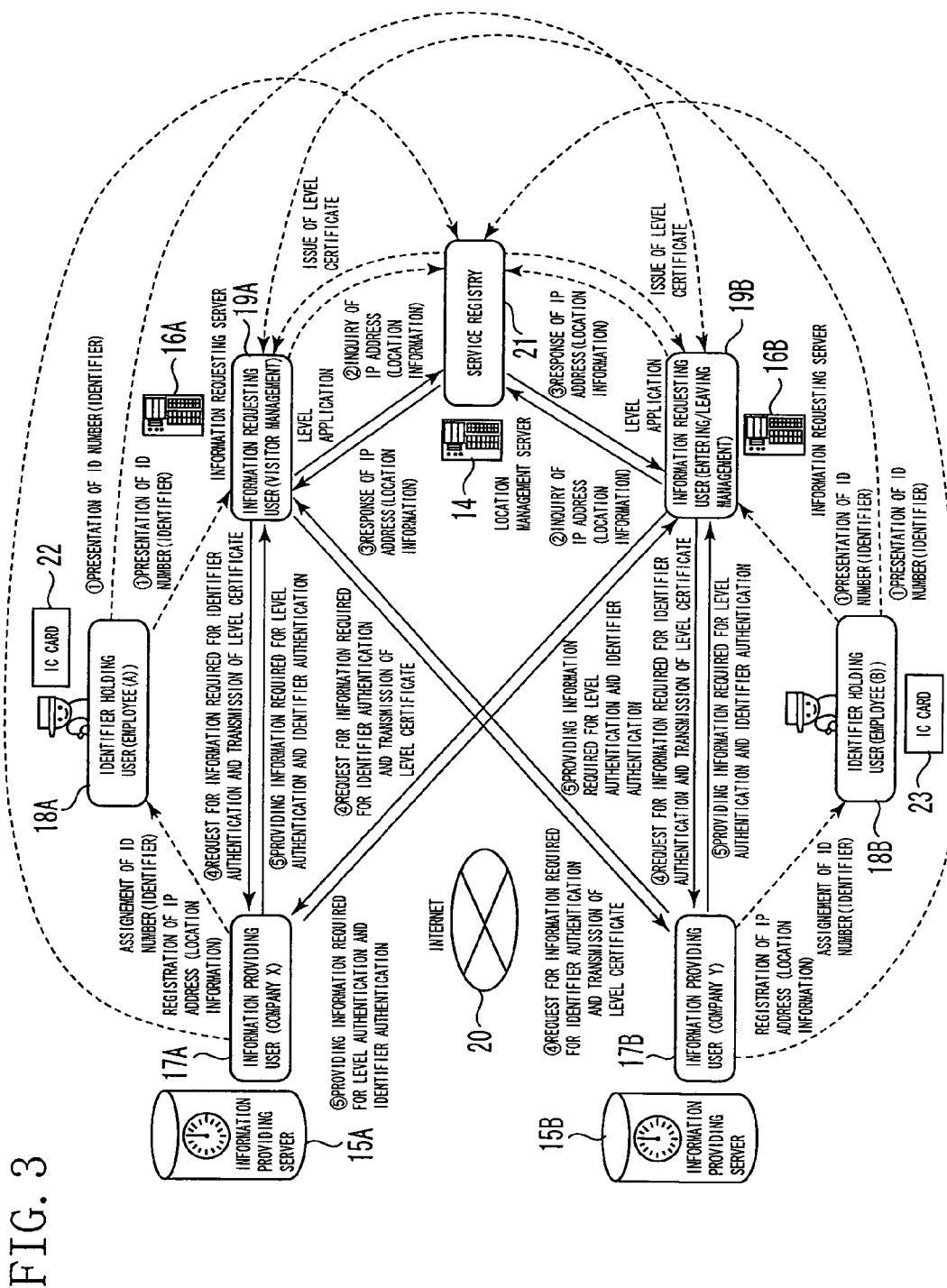
FIG. 3 is a block diagram of the identifier authenticating system shown as one example.
Figure 4:
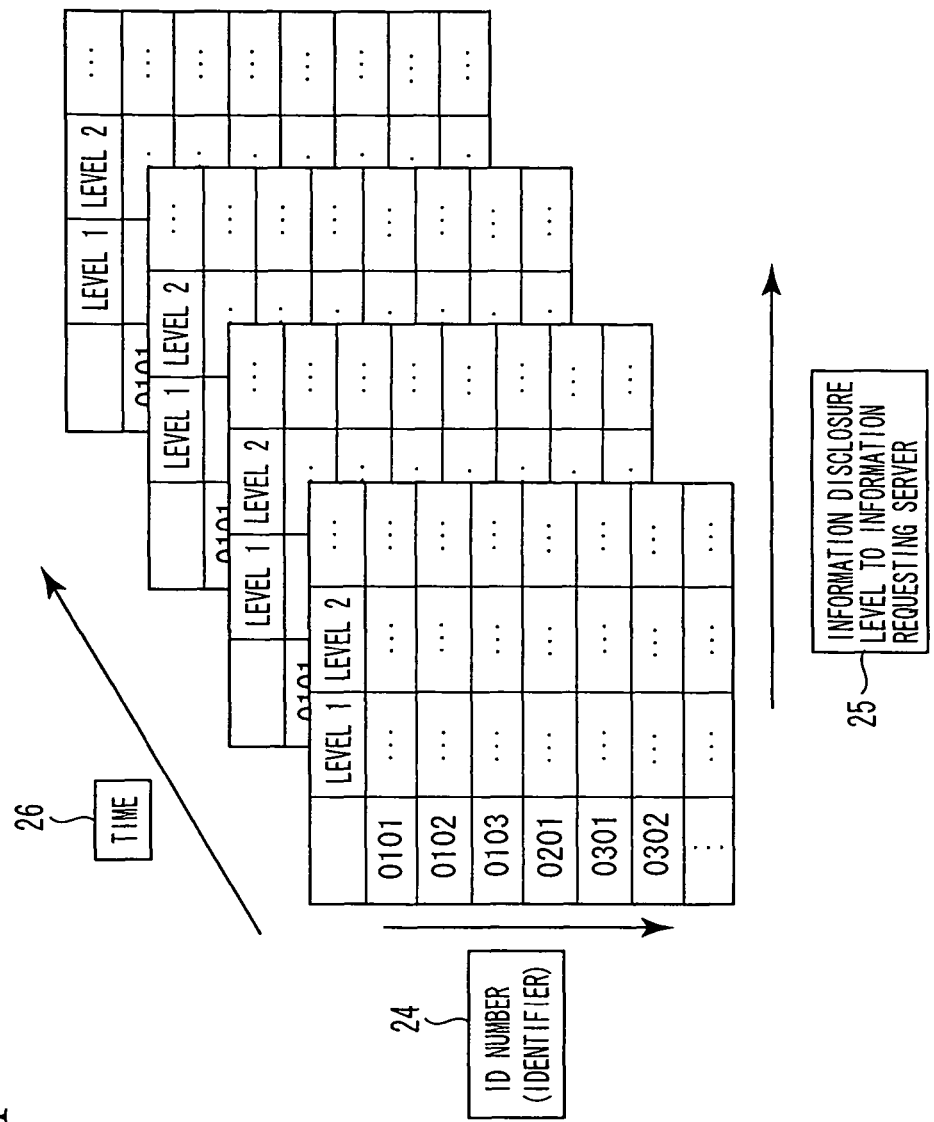
FIG. 4 is a view showing the predetermined information specified by three kinds of identification information (n=3)

FIG. 3 is a block diagram of the identifier authenticating system shown as one example. FIG. 4 is a view showing the predetermined information specified from three kinds of identification information (n=3). The three kinds of identification information in the system shown in FIG. 3 are a plurality of ID numbers 24 (identifiers), a plurality of information disclosure levels 25 to the information requesting servers 16A and 16B, and a time 26. In the system shown in FIG. 3, each of the servers 14, 15A, 15B, 16A, and 16B are connected with the Internet 20. In FIGS. 3 and 4, the system will be described using visitor management in a business partner company for managing business card information of the employee(A) 18A (identifier holding user) of the company X and the employee(B) 18B (identifier holding user) of the company Y who are visitors to the company, based on the predetermined information provided by the information providing servers 15A and 15B, and entering/leaving management for permitting entering/leaving of the employee(A) 18A (identifier holding user) in the company X and permitting entering/leaving of the employee(B) 18B (identifier holding user) in the company Y based on the predetermined information provided by information providing servers 15A and 15B, as an example. The employee(A) 18A is an employee of the company X and the employee(B) 18B is an employee of the company Y. The company X lends the IC card 22 to the employee(A) 18A, and the company Y lends the IC card 23 to the employee(B) 18B. A predetermined ID number 24 (identifier) is stored in these IC cards 22 and 23.

In the system shown in FIG. 3, a information disclosure level 25 to the information requesting servers 16A and 16B (information requesting users 19A and 19B), which is one of the identification information, is classified into a first level to a second level. However, the information disclosure level 25 to the information requesting servers 16A and 16B is not limited to the first to second levels, but the information disclosure level 25 may be classified into the first to three or more disclosure levels (first to L-th disclosure levels) if the number of services becomes three or more other than the visitor management and the entering/leaving management. Here, the information disclosure level 25 to the information requesting servers 16A and 16B changes depending on the service contents carried out by the information requesting users 19A and 19B, and a range of the predetermined information and a type of the predetermined information provided to the information requesting servers 16A and 16B further change depending on the information disclosure level 25.

For example, when a certain information requesting server 16 authenticates a certain person, the disclosure level differs depending on how far information of the person to be authenticated is required and is sufficient. Specifically, the information disclosure level to the information requesting server 16 differs depending on whether all the information of a working company name, a belonging department, a full name, a staff number, and a facial photo of a person to be authenticated are necessary and sufficient, or a part of the information (a full name, a staff number, a facial photo) in the information is necessary and sufficient, as the service contents carried out by the information requesting users 19A and 19B. As described above, classifying the information requesting server 16 into each level makes it possible to select the necessary and sufficient information for every information requesting server 16, and to prevent provision of unnecessary and insufficient information. Meanwhile, although a plurality of ID numbers (identifiers) corresponding to these services have been needed for every service content to be carried out so far, predetermined information to be provided can be selected for every service to be carried out by utilizing the level, thus allowing various types of authentication corresponding to a plurality of services to be achieved only by giving one ID number (identifier) to the identifier holding users.

In this system, the location management server 14 (service registry operator 21) determines the information disclosure level 25 to the information requesting servers 16A and 16B in advance (pre-registration system). Alternatively, the information providing servers 15A and 15B authenticate the information disclosure level 25 to the information requesting servers 16A and 16B based on level certificates held by the information requesting users 19A and 19B (information providing server authentic method). In a pre-registration system, the information requesting users 19A and 19B apply for own user information and required service contents with the service registry operator 21, and the service registry operator 21 determines the information disclosure level 25 to the information requesting servers 16A and 16B based on the applied information, and issues the level certificates to the information requesting users 19A and 19B. The application of the information disclosure level to the service registry operator 21 is made by an electronic application or a written application. Specifically, the information requesting users 19A and 19B submit applications on which a company name, a type of industry, a purpose of use, and the like are written to the service registry operator 21. Further, the information requesting user 19A submits a document proving being general company which can request visitor's business card information, and the information requesting user 19B submits a document proving being building management company which employs the entering/leaving management system for the information on the entering/leaving management. When the applications and those documents are submitted, the service registry operator 21 examines contents of the applications and documents to thereby determine the information disclosure level 25 to the information requesting servers 16A and 16B. When the service registry operator 21 determines the information disclosure level 25 to the information requesting servers 16A and 16B, it issues the level certificate (electronic certificate) indicating the determined level 25 to the information requesting users 19A and 19B.

Predetermined information specified by multiplying three kinds of identification information including the ID numbers 24 (identifiers) of the employee(A) 18A and the employee(B) 18B, the information disclosure levels 25 to the information requesting users 19A and 19B, and the time 26 is stored in the information providing servers 15A and 15B. Three kinds of identification information including the ID number 24, the information disclosure level 25, and the time 26 form respective items in a three-dimensional table as shown in FIG. 4. Here, the predetermined information corresponding to the first level includes a company name, a belonging department, a full name, an address of the company, and a contact in the company, and the predetermined information corresponding to the second level includes a company name and a staff number.

In the case of visiting the business partner company, a person in charge of the business partner company (information requesting user 19A) confirms what types of persons the employee(A) 18A of the company X and the employee(B) 18B of the company Y are. The information providing server 15A is installed in the company X (information providing user 17A) where the employee(A) 18A works, and the information providing server 15B is installed in the company Y (information providing user 17B) where the employee(B) 18B works. The information requesting server 16A is installed in the business partner company. The location management server 14 is installed in a business office of the service registry operator 21. The confirmed IP addresses (confirmed location information) of the information providing servers 15A and 15B are registered on the location management server 14. The employee(A) 18A and the employee (B) 18B who visit the business partner company present the IC cards 22 and 23 having a business card function to an IC card reader/writer (not shown) installed in the business partner company. When the employee(A) 18A and the employee (B) 18B present the IC cards 22 and 23 to the IC card reader/writer, the ID numbers 24 stored in the IC cards 22 and 23 are read, and the ID numbers 24 are transmitted to the information requesting server 16A of the business partner company from the reader/writer.

The ID number 24 is divided into several hierarchical portions, and each divided hierarchical portion corresponds to one of the IP address of each location management server 14, the IP addresses of the information providing servers 15A and 15B, and the identification information for specifying the predetermined information. In the information providing server authentic method, the highest ID number in the ID number 24 corresponds to the IP address of the second location management server, and the lowest ID number therein corresponds to one of the identification information, for example. Further, respective middle ID numbers between the highest ID number and the lowest ID number correspond to the IP addresses of each location management server and the information providing servers 15A and 15B. Incidentally, the predetermined information is specified by multiplying each identification information of the lowest ID number, the information disclosure level, and the time.

When the IC card 22 is presented, the information requesting server 16A in the business partner company asks the location management server 14 about a location of the information providing server 15A installed in the company X. In the system, an inquiry and a response are repeated between the location management server 14 and the information requesting server 16A starting from the first location management server toward the k-th location management server, and a confirmed IP address (confirmed location information) of the information providing server 15A in the company X corresponding to the presented ID number 24 is retrieved. The k-th location management server returns the confirmed IP address of the information providing server 15A to the information requesting server 16A. The information requesting server 16A accesses the information providing server 15A using the returned confirmed IP address, and also transmits the level certificate to the information providing server 15A to thereby request the information providing server 15A to provide the predetermined information on the employee(A) 18A.

In response to the request from the information requesting server 16A, the information providing server 15A identifies whether or not the IC card 22 held by the employee(A) 18A is expired based on the ID number 24, the information disclosure level 25, and the time 26. When the IC card 22 is not expired, the information providing server 15A transmits the predetermined information (the company name, the belonging department, the full name, the address of the company, the contact in the company) corresponding to the ID number 24 and the information disclosure level 25, to the information requesting server 16A. When the IC card 22 is expired, the information providing server 15A transmits a notice that the IC card is expired to the information requesting server 16A. The person in charge of the business partner company can grasp what kind of person the visiting employee(A) 18A is based on the transmitted predetermined information (business card information).

Meanwhile, when the IC card 23 is presented, the information requesting server 16A in the business partner company asks the location management server 14 about a location of the information providing server 15B installed in the company Y. In the system, an inquiry and a response are repeated between the location management server 14 and the information requesting server 16A starting from the first location management server toward the k-th location management server, and a confirmed IP address (confirmed location information) of the information providing server 15B in the company Y corresponding to the presented ID number 24 is retrieved. The k-th location management server returns the confirmed IP address of the information providing server 15B to the information requesting server 16A. The information requesting server 16A accesses the information providing server 15B using the returned confirmed IP address, and also transmits the level certificate to the information providing server 15B to thereby request the information providing server 15B to provide the predetermined information on the employee(B) 18B.

In response to the request from the information requesting server 16A, the information providing server 15B identifies whether or not the IC card 23 held by the employee(B) 18B is expired based on the ID number 24, the disclosure level 25, and the time 26. When the IC card 23 is not expired, the information providing server 15B transmits the predetermined information (the company name, the belonging department, the full name, the address of the company, the contact in the company) corresponding to the ID number 24 and the information disclosure level 25, to the information requesting server 16A. When the IC card 23 is expired, the information providing server 15B transmits a notice that the IC card is expired to the information requesting server 16A. The person in charge of the business partner company can grasp what kind of person the visiting employee(B) 18B is based on the transmitted predetermined information (business card information).

In the entering/leaving management to the companies X and Y (information providing users 15A and 15B) the entering/leaving management system (not shown) employed by the building management company (information requesting user 19B) confirms whether or not entering/leaving the companies X and Y is possible based on the IC cards 22 and 23 that the employee(A) 18A and the employee(B) 18B have. The information providing server 15A is installed in the company X (information providing user 17A) where the employee(A) 18A works, and the information providing server 15B is installed in the company Y (information providing user 17B) where the employee(B) 18B works. The information requesting server 16B is installed in the management company. The information requesting server 16B is connected with the entering/leaving management system. The location management server 14 is installed in a business office of the service registry operator 21. The confirmed IP addresses (confirmed location information) of the information providing servers 15A and 15B are registered on the location management server 14. When the employee(A) 18A and the employee(B) 18B come to office to enter/leave predetermined rooms of the companies X and Y, the employee(A) 18A and the employee (B) 18B present the IC cards 22 and 23 having an employee ID card function to IC card readers/writers (not shown) installed near the doors. When the employee(A) 18A and the employee(B) 18B present the IC cards 22 and 23 to the IC card readers/writers, the ID numbers 24 stored in the IC cards 22 and 23 are read, and the ID numbers 24 are transmitted to the information requesting server 16B in the management company from the readers/writers.

When the IC card 22 is presented, the information requesting server 16B in the management company asks the location management server 14 about a location of the information providing server 15A installed in the company X. In the system, an inquiry and a response are repeated between the location management server 14 and the information requesting server 16B starting from the first location management server toward the k-th location management server, and a confirmed IP address (confirmed location information) of the information providing server 15A in the company X corresponding to the presented ID number 24 is retrieved. The k-th location management server returns the confirmed IP address of the information providing server 15A to the information requesting server 16B. The information requesting server 16B accesses the information providing server 15A using the returned confirmed IP address, and also transmits the level certificate to the information providing server 15A to thereby request the information providing server 15A to provide the predetermined information on the employee(A) 18A.

In response to the request from the information requesting server 16B, the information providing server 15A identifies whether or not it is a time zone for the employee(A) 18A (entering/leaving person) to be able to enter/leave the room based on the ID number 24, the information disclosure level 25, and the time 26. When it is a time zone for the employee (A) 18A to be able to enter/leave the room, the information providing server 15A transmits the predetermined information (information on whether or not the employee(A) 18A can enter/leave the room (whether or not the IC card 22 is valid)) specified by multiplying each identification information of the ID number 24 and the information disclosure level 25 to the information requesting server 16A. When it is not a time zone for the employee(A) 18A to be able to enter/leave the room, or the IC card 22 is unauthorized, the information providing server 15A transmits information that employee (A) 18A cannot enter/leave the room to the information requesting server 16A. When the entering/leaving management system determines that the employee(A) 18A can enter/ leave the room based on the predetermined information received by the information requesting server 16A, it turns off power to an electric lock to thereby release a door lock. Conversely, when it determines that the employee(A) 18A cannot enter/leave the room, it keeps the door unlocked without turning off the power to the electric lock.

When the IC card 23 is presented, the information requesting server 16B in the management company asks the location management server 14 about a location of the information providing server 15B installed in the company Y. In the system, an inquiry and a response are repeated between the location management server 14 and the information requesting server 16B starting from the first location management server toward the k-th location management server, and a confirmed IP address (confirmed location information) of the information providing server 15B in the company Y corresponding to the presented ID number 24 is retrieved. The k-th location management server returns the confirmed IP address of the information providing server 15B to the information requesting server 16B. The information requesting server 16B accesses the information providing server 15B using the returned confirmed IP address, and also transmits the level certificate to the information providing server 15B to thereby request the information providing server 15B to provide the predetermined information on the employee(B) 18B.

In response to the request from the information requesting server 16B, the information providing server 15B identifies whether or not it is a time zone for the employee(B) 18B (entering/leaving person) to be able to enter/leave the room based on the ID number 24, the information disclosure level 25, and the time 26. When it is a time zone for the employee (B) 18B to be able to enter/leave the room, the information providing server 15B transmits to the predetermined information (information on whether or not the employee(B) 18B can enter/leave the room (whether or not the IC card 23 valid)) specified by multiplying each identification information of the ID number 24 and the information disclosure level 25 to the information requesting server 16A. When it is not a time zone for the employee(B) 18B to be able to enter/leave the room, or the IC card 23 is unauthorized, the information providing server 15B transmits information that employee (A) 18A cannot enter/leave the room to the information requesting server 16A. When the entering/leaving management system determines that the employee(B) 18B can enter/leave the room based on the predetermined information received by the information requesting server 16A, it turns off power to an electric lock to thereby release a door lock. Conversely, when it determines that the employee(B) 18B cannot enter/leave the room, it keeps the door unlocked without turning off the power to the electric lock.

Figure 5:
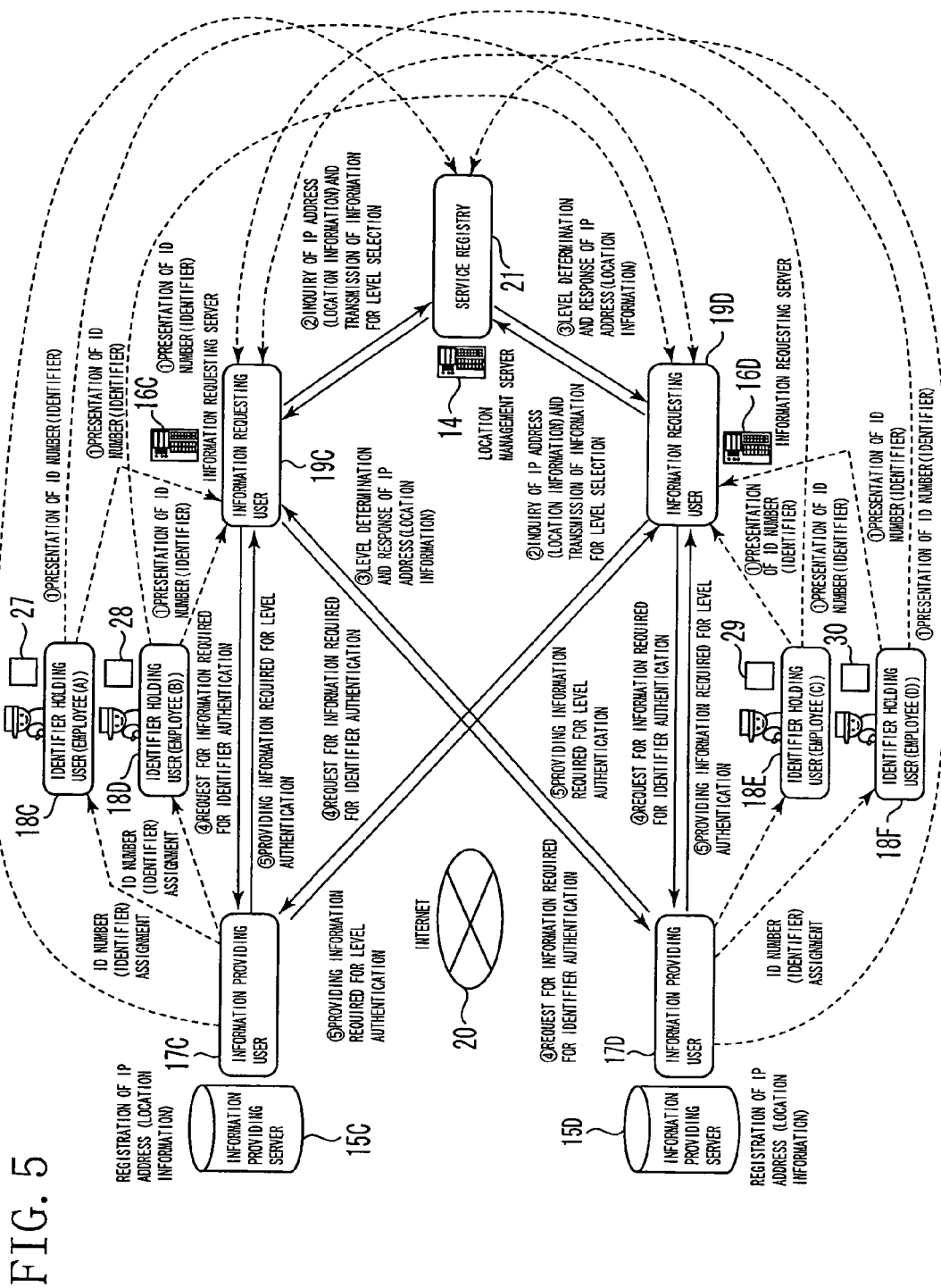
FIG. 5 is a block diagram of an identifier authenticating system shown as another example.
Figure 6:
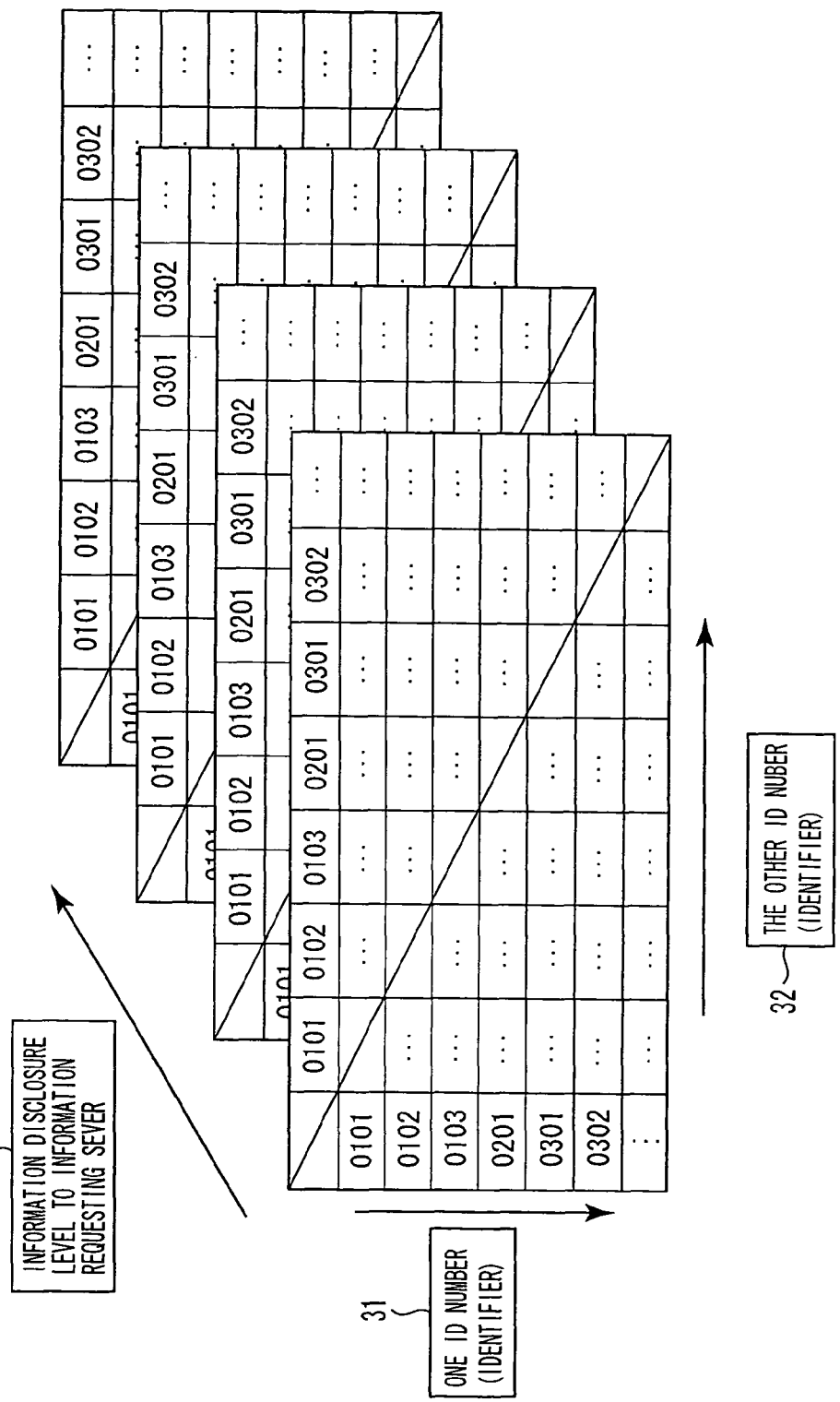
FIG. 6 is a view showing the predetermined information specified by three kinds of identification information (n=3).

FIG. 5 is a block diagram of an identifier authenticating system shown as another example. FIG. 6 is a view showing the predetermined information specified from three kinds of identification information (n=3). The three kinds of identification information in the system of FIG. 5 are one ID number 31 (identifier), the other ID number 32 (identifier), and the information disclosure level 33 to information requesting servers 16C and 16D. In the system of FIG. 5, each of servers 14, 15C, 15D, 16C, and 16D are connected with the Internet 20. In FIG. 5 and FIG. 6, this system will be described using visitor management for authenticating two persons of an employee(A) 18C (identifier holding user) and an employee (B) 18D (identifier holding user), and two persons of an employee(C) 18E (identifier holding user) and an employee (D) 18F (identifier holding user) in a business partner company, who are visitors to the company, based on the predetermined information provided by the information providing servers 15C and 15D, and entering/leaving management for authenticating two persons of the employee(A) 18C and the employee(B) 18D, and two persons of the employee(C) 18E and the employee(D) 18F who are persons of entering/leaving the company based on the predetermined information provided by the information providing servers 15C and 15D, as an example. The employee(A) 18C and the employee(B) 18D are the employees of the company X, and the employee(C) 18E and the employee(D) 18F are the employees of the company Y. The company X lends IC cards 27 and 28 to the employee(A) 18C and the employee(B) 18D, and the company Y lends IC cards 29 and 30 to the employee(C) 18E and the employee(D) 18F, respectively. Predetermined ID numbers 31 and 32 are stored in these IC cards 27 and 28, and 29 and 30, respectively. The information disclosure level 33 to the information requesting servers 16C and 16D (information requesting users 19C and 19D) is classified into the first level to the second level in the system shown in FIG. 5.

In this system, the location management server 14 (service registry operator 21) determines the information disclosure level 33 to the information requesting servers 16C and 16D (information requesting users 19C and 19D) in real time (real-time system). In addition, the location management server 14 authenticates the information disclosure level 33 of the information requesting servers 16C and 16D (location management server authentic method). The information requesting servers 16C and 16D select a corresponding item from type of industry, purpose of use, service contents, and the like in question items disclosed by the service registry operator 21 when asking locations of the information providing servers 15C and 15D, and transmits the selected question item information to the first location management server that is the highest in the location management servers 14. The first location management server determines in real time the information disclosure level 33 to the information requesting servers 16C and 16D which have asked about the location, based on the transmitted question item information.

Predetermined information specified by multiplying three kinds of identification information of two ID numbers 31 and 32 and the information disclosure level 33 is stored in the information providing servers 15C and 15D. Three kinds of identification information including the ID numbers 31 and 32 of the employees(A) and (B), and the ID numbers 31 and 32 of the employees(C) and (D), and the information disclosure level 33 form respective items in a three-dimensional table as shown in FIG. 6. Here, the predetermined information corresponding to the first level includes a company name, a belonging department, a full name, an address of the company, contact in the company, a group mail address, and information on a person in charge, and the predetermined information corresponding to the second level includes a company name and a staff number.

In the case of visiting a business partner company, a person in charge of the business partner company (information requesting user 19C) confirms what kind of persons the employee(A) 18C and the employee(B) 18D of the company X are and information obtained from two persons, and the person in charge of the business partner company also confirms what kind of persons the employee(C) 18E and the employee(D) 18F of the company Y are, and information obtained from two persons. The information providing server 15C is installed in the company X (information providing user 17C) for which the employee(A) 18C and the employee (B) 18D work, and the information providing server 15D is installed in the company Y (information providing user 17D) for which the employee(C) 18E and the employee(D) 18F work. The information requesting server 16C is installed in the business partner company. The location management server 14 is installed in a business office of the service registry operator 21. The confirmed IP address (confirmed location information) corresponding to the level 1 of the information providing servers 15C and 15D and the confirmed IP address (confirmed location information) corresponding to the level 2 are registered on the location management server 14.

The employee(A) 18C and the employee(B) 18D who visit the business partner company present the IC cards 27 and 28 having a business card function to an IC card reader/writer (not shown) installed in the business partner company. When the employee(A) 18C and the employee(B) 18D present the IC cards 27 and 28 to the IC card reader/writer, the ID numbers 31 and 32 stored in these IC cards 27 and 28 are read, and the ID numbers 31 and 32 are transmitted from the reader/writer to the information requesting server 16C in the business partner company. The ID numbers 31 and 32 are divided into several hierarchical portions, and each divided hierarchical portion corresponds to the IP address of each location management server 14, the IP address of the information providing server 15C, and the identification information that is one of the predetermined information. For example, in the location management server authentic method, the information disclosure level corresponds to the IP address of the second location management server, the highest ID number in the ID numbers 27 and 28 corresponds to the IP address of the third location management server, and the lowest ID number corresponds to one of the identification information. Further, respective middle ID numbers between the highest ID number and the lowest ID number correspond to IP addresses of each location management server and the information providing servers 15A and 15B. It is to be noted that the predetermined information is specified by multiplying the lowest ID numbers of two IC cards, and each identification information of the information disclosure level.

When the IC cards 27 and 28 are presented, the information requesting server 16C in the business partner company asks the location management server 14 about a location of the information providing server 15C installed in the company X. At this time, the selected question item information is transmitted from the information requesting server 16C to the first location management server. Incidentally, the information requesting server 16C is a general company, and it aims at obtaining business card information of a person in charge in the business partner company who visits, and whose level is the level 1.

The first location management server immediately determines and authenticates the information disclosure level 33 to the information requesting server 16C as the level 1 based on the question item information transmitted from the information requesting server 16C, and returns an IP address (confirmed location information) of the second location management server corresponding to the information disclosure level 33. In the system, an inquiry and a response are repeated between the location management server 14 and the information requesting server 16C starting from the second location management server toward the k-th location management server, and a confirmed IP address (confirmed location information) of the information providing server 15C corresponding to the presented ID numbers 31 and 32, and the determined information disclosure level 33 is retrieved. The k-th location management server returns the confirmed IP address of the information providing server 15C corresponding to the presented ID numbers 31 and 32, and the determined information disclosure level 33 to the information requesting server 16C. The information requesting server 16C uses the returned confirmed IP address to access the information providing server 15C, and request the information providing server 15C to provide the predetermined information corresponding to the presented ID numbers 31 and 32, and the determined information disclosure level 33.

In response to the request of the information requesting server 16C, the information providing server 15C transmits the company name, the belonging department, the full name, the address of the company, the contact in the company which are the predetermined information of the level 1 of the information disclosure level 33 to the information requesting server 16C for every two IC cards (identifier) 31 and 32 given to the employee(A) 18C and the employee(B) 18D, and further transmits to the information requesting server 16C the predetermined information on a common group mail address of the employee(A) 18C and the employee(B) 18D from two IC cards (identifier) 31 and 32, and which will be a person in charge (information on a person in charge) between the employee(A) 18C and the employee(B) 18D.

The employee(C) 18E and the employee(D) 18F who visit the business partner company present the IC cards 29 and 30 having a business card function to an IC card reader/writer (not shown) installed in the business partner company. When the employee(C) 18E and the employee(D) 18F present the IC cards 29 and 30 to the IC card reader/writer, the ID numbers 31 and 32 stored in these IC cards 29 and 30 are read, and the ID numbers 31 and 32 are transmitted from the reader/writer to the information requesting server 16C in the business partner company. The ID numbers 31 and 32 are divided into several hierarchical portions, and each divided hierarchical portion corresponds to the IP address of each location management server 14, the IP address of the information providing server 15D, and the identification information that is one of the predetermined information.

When the IC cards 29 and 30 are presented, the information requesting server 16C in the business partner company asks the location management server 14 about a location of the information providing server 15D installed in the company Y. At this time, the selected question item information is transmitted from the information requesting server 16C to the first location management server. Incidentally, the information requesting server 16C is a general company, and it aims at obtaining business card information of a person in charge in the business partner company who visits, and whose level is the level 1.

The first location management server immediately determines and authenticates the information disclosure level 33 to the information requesting server 16C as the level 1 based on the question item information transmitted from the information requesting server 16C, and returns an IP address (confirmed location information) of the second location management server corresponding to the information disclosure level 33. In the system, an inquiry and a response are repeated between the location management server 14 and the information requesting server 16C starting from the second location management server toward the k-th location management server, and a confirmed IP address (confirmed location information) of the information providing server 15D corresponding to the presented ID numbers 31 and 32, and the determined information disclosure level 33 is retrieved. The k-th location management server returns the confirmed IP address of the information providing server 15D corresponding to the presented ID numbers 31 and 32, and the determined information disclosure level 33 to the information requesting server 16C. The information requesting server 16C uses the returned confirmed IP address to access the information providing server 15D, and request the information providing server 15D to provide the predetermined information on the employee(C) 18E and the employee(D) 18F.

In response to the request of the information requesting server 16C, the information providing server 15D transmits the company name, the belonging department, the full name, the address of the company, and contact in the company which are the predetermined information of the level 1 of the information disclosure level 33 to the information requesting server 16C for every two IC cards (identifier) 31 and 32 given to the employee(C) 18E and the employee(D) 18F, and further transmits to the information requesting server 16C the predetermined information on a common group mail address of the employee(C) 18E and the employee(D) 18F from two IC cards (identifier) 31 and 32, and which will be a person in charge (information on a person in charge) between the employee(C) 18E and the employee(D) 18F.

In the entering/leaving management to the companies X and Y (information providing user 17C and 17D), information on whether or not entering/leaving a security room where single person is not further permitted to enter is possible by the IC cards 27 and 28 respectively held by the employee(A) 18C (identifier holding user) and the employee(B) 18D (identifier holding user) is provided to the entering/leaving management system (not shown) that the building management company (information requesting user 19D) employs, and information on whether or not entering/leaving the security room is possible by the IC cards 29 and 30 respectively held by the employee(C) 18E (identifier holding user) and the employee(D) 18F (identifier holding user) is also provided to the entering/leaving management system.

The information providing server 15C is installed in the company X (information providing user 17C) for which the employee(A) 18C and the employee(B) 18D work, and the information providing server 15D is installed in the company Y (information providing user 17D) for which the employee (C) 18E and the employee(D) 18F work. The information requesting server 16D is installed in the management company. The information requesting server 16D is connected with the entering/leaving management system. The location management server 14 is installed in a business office of the service registry operator 21. The confirmed IP addresses (confirmed location information) of the information providing servers 15C and 15D are registered on the location management server 14. The location management server 14 determines in real time the level of the information requesting server 16D which has asked about the location, based on the transmitted question item information.

When the employee(A) 18C and the employee(B) 18D come to the office and enter the security room of the company X, the employee(A) 18C and the employee(B) 18D present the IC cards 27 and 28 having an employee ID card function to the IC card reader/writer (not shown) installed near the door. When the employee(A) 18C and the employee(B) 18D present the IC cards 27 and 28 to the IC card reader/writer, the ID numbers 31 and 32 stored in the IC cards 27 and 28 are read, and these ID numbers 31 and 32 are transmitted from the reader/writer to the information requesting server 16D in the management company.

When the IC cards 27 and 28 are presented, the information requesting server 16D in the management company asks the location management server 14 about a location of the information providing server 15C installed in the company X. At this time, the selected question item is transmitted from the information requesting server 16D to the first location management server. The first location management server immediately determines and authenticates the level to the server 16D as the level 2 based on the question item information transmitted from the information requesting server 16D, and returns an IP address (confirmed location information) of the second location management server corresponding to the level. In the system, an inquiry and a response are repeated between the location management server 14 and the information requesting server 16D starting from the second location management server toward the k-th location management server, and a confirmed IP address (confirmed location information) of the information providing server 15C in the company X corresponding to the presented ID numbers 31 and 32 and the determined level is retrieved. The k-th location management server returns the confirmed IP address of the information providing server 15C to the information requesting server 16D. The information requesting server 16D uses the returned confirmed IP address to access the information providing server 15C, and requests the information providing server 15C to provide predetermined information specified by multiplying each identification information of the presented ID numbers 31 and 32 and the determined information disclosure level 33.

In response to the request of the information requesting server 16D, the information providing server 15C transmits information on whether or not the employee(A) 18C and the employee(B) 18D can enter/leave the security room to the server 16D. When the entering/leaving management system determines that they can enter/leave the security room based on the predetermined information of whether or not they cane enter/leave the room received by the information requesting server 16A, it turns off power to an electric lock to thereby release a door lock. Conversely, when it determines that they cannot enter/leave the room, it keeps the door unlocked without turning off the power to the electric lock.

When the employee(C) 18E and the employee(D) 18F come to the office and enter the security room of the company Y, the employee(C) 18E and the employee(D) 18F present the IC cards 29 and 30 having an employee ID card function to the IC card reader/writer (not shown) installed near the door. When the employee(C) 18E and the employee(D) 18F present the IC cards 29 and 30 to the IC card reader/writer, the ID numbers 31 and 32 stored in the IC cards 29 and 30 are read, and these ID numbers 31 and 32 are transmitted from the reader/writer to the information requesting server 16D in the management company.

When the IC cards 29 and 30 are presented, the information requesting server 16D in the management company asks the location management server 14 about a location of the information providing server 15D installed in the company Y. At this time, the selected question item is transmitted from the information requesting server 16D to the first location management server. The first location management server immediately determines and authenticates the level to the server 16D as the level 2 based on the question item information transmitted from the information requesting server 16D, and returns an IP address (confirmed location information) of the second location management server corresponding to the level. In the system, an inquiry and a response are repeated between the location management server 14 and the information requesting server 16D starting from the second location management server toward the k-th location management server, and a confirmed IP address (confirmed location information) of the information providing server 15D in the company Y corresponding to the presented ID numbers 31 and 32 and the determined level is retrieved. The k-th location management server returns the confirmed IP address of the information providing server 15D to the information requesting server 16D. The information requesting server 16D uses the returned confirmed IP address to access the information providing server 15D, and requests the information providing server 15D to provide predetermined information specified by multiplying each identification information of the presented ID numbers 31 and 32 and the determined information disclosure level 33.

In response to the request of the information requesting server 16D, the information providing server 15D transmits information on whether or not the employee(C) 18E and the employee(D) 18F can enter/leave the security room to the server 16D. When the entering/leaving management system determines that they can enter/leave the security room based on the predetermined information of whether or not they cane enter/leave the room received by the information requesting server 16A, it turns off power to an electric lock to thereby release a door lock. Conversely, when it determines that they cannot enter/leave the room, it keeps the door unlocked without turning off the power to the electric lock.

In the systems shown in FIG. 3 and FIG. 5, the information requesting servers 16A and 16C in the business partner company, and the information requesting servers 16B and 16D in the building management company count a reading time (identifier presentation time) of the ID numbers 24, 31, and 32 after the IC cards 22, 23, 27, 28, 29, and 30 are presented to the IC card readers/writers, and transmits the counted reading time to the information providing servers 15A, 15B, 15C, and 15D. The information providing servers 15A, 15B, 15C, and 15D compare the set time that is set in advance with the received reading time, and if the reading time exceeds the set time, it stops transmission of the predetermined information to the information requesting servers 16A, 16B, 16C, and 16D.

The information requesting servers 16A and 16C in the business partner company and the information requesting servers 16B and 16D in the building management company store the confirmed IP addresses of the information providing servers 15A, 15B, 15C, and 15D corresponding to the ID numbers 24, 31, and 32, and also stores the confirmed IP address of the location management server 14, so that retrieval of the location management servers higher than the location management server that stores the confirmed IP address stored in the information requesting servers 16A, 16B, 16C, and 16D is omitted. Meanwhile, when retrieval of the location management servers lower than the location management server immediately lower than the location management server that stores the confirmed IP address, and the information providing servers 15A, 15B, 15C, and 15D is needed, the information providing servers 15A, 15B, 15C, and 15D are retrieved by repeating an inquiry and a response between the location management server 14, and the information requesting servers 16A, 16B, 16C, and 16D starting from the location management server immediately lower than the location management server that stores the confirmed IP address toward the lower servers.

The storage times of the confirmed IP address of the location management server 14 and the confirmed IP addresses of the information providing servers 15A, 15B, 15C, and 15D are set to the information requesting servers 16A and 16C in the business partner company, and the information requesting servers 16B and 16D in the building management company. When the storage times elapse, those information requesting servers 16A, 16B, 16C, and 16D erase the stored confirmed IP address of the location management server 14 and confirmed IP addresses of the information providing servers 15A, 15B, 15C, and 15D. Additionally, the information requesting servers 16A and 16C (information requesting user 19A and 19C) in the business partner company, and the information requesting servers 16B and 16D (information requesting user 19B and 19D) in the building management company can arbitrarily erase the confirmed IP address of the location management server 14 stored in the information requesting servers 16A, 16B, 16C, and 16D, and the confirmed IP addresses of the information providing servers 15A, 15B, 15C, and 15D.

According to the systems shown in the drawings, the information requesting servers 16, 16A, 16B, 16C, and 16D can share all the predetermined information held by each of the information providing servers 15, 15A, 15B, 15C, and 15D, and the information requesting users 19, 19A, 19B, 19C, and 19D can easily obtain the predetermined information stored in the information providing servers 15, 15A, 15B, 15C, and 15D. According to the systems, the location management server 14 unifies management of the location information of the information providing servers 15, 15A, 15B, 15C, and 15D, and the location management server 14 responds to an inquiry of the confirmed IP addresses of the information providing servers 15, 15A, 15B, 15C, and 15D, so that the information requesting servers 16, 16A, 16B, 16C, and 16D can access all the information providing servers 15, 15A, 15B, 15C, and 15D, and the information requesting users 19, 19A, 19B, 19C, and 19D can easily receive the predetermined information from those information providing servers 15, 15A, 15B, 15C, and 15D. According to the systems, the predetermined information is specified by multiplying a plurality of pieces of identification information, such as identification of a plurality of identifier holding users, identification of a plurality of services, and identification by time, and the specified predetermined information is provided to the information requesting server, so that the predetermined information provided by these pieces of identification information can be changed, and various identifier authentication services can be received by this one system.

According to the systems, since the location management server 14 can determine the information disclosure level to the information requesting servers 16, 16A, 16B, 16C, and 16D, and change the provided predetermined information depending on the information requesting servers 16, 16A, 16B, 16C, and 16D, only one ID number (identifier) is required although a plurality of ID numbers have been needed for every service so far, and various identifier authentication services can be received by one of the ID numbers 22, 23, 27, 28, 29, and 30.

According to the systems, the location management servers 14, 14A, 14B, and 14C, the information providing server 15, 15A, 15B, 15C, and 15D, and the information requesting servers 16, 16A, 16B, 16C, and 16D are connected with each other through the Internet 20, and a series of processes including the inquiry of the confirmed IP address, the response of the confirmed IP address, the determination and authentication of the level, and the provision of the predetermined information are executed through the Internet 20, and thus the information requesting users 19A, 19B, 19C, and 19D can share the predetermined information held by the information providing servers 15, 15A, 15B, 15C, and 15D by utilizing the Internet 20, so that anyone can obtain anywhere easily the authorization information stored in the information providing servers 15, 15A, 15B, 15C, and 15D if there is an Internet connection environment. According to the systems, all the predetermined information held in the information providing servers 15, 15A, 15B, 15C, and 15D can be shared by utilizing the Internet 20 which is an existing public communication network, so that the information requesting users 19A, 19B, 19C, and 19D can receive various identifier authentication services without being limited to specific identifier authentication services.

According to the systems, the location management server 14 is divided into a highest first location management server to a lowest k-th location management server, and a plurality of location management servers 14 decentrally manage the IP addresses of the information providing servers 15, 15A, 15B, 15C, and 15D, so that a load on the location management server 14 can be reduced as compared with the case where single location management server manages the IP addresses of the information providing servers 15, 15A, 15B, 15C, and 15D. According to the systems, retrieval of the location management servers higher than the location management server that stores the confirmed IP address stored in the information requesting servers 16, 16A, 16B, 16C, and 16D is omitted, and the information providing servers 15, 15A, 15B, 15C, and 15D are retrieved by repeating an inquiry and a response between the location management server 14, and the information requesting servers 16, 16A, 16B, 16C, and 16D starting from the location management server immediately lower than the location management server that stores the confirmed IP address toward the lower servers, so that it is not necessary to repeat the retrieval of the information providing servers 15, 15A, 15B, 15C, and 15D from the first location management server, thus allowing the information providing servers 15, 15A, 15B, 15C, and 15D to be retrieved quickly.

According to the systems, since the information requesting servers 16, 16A, 16B, 16C, and 16D erase the confirmed IP addresses stored therein when the storing time of the confirmed IP address has elapsed, the systems can be coped with it even when the information requesting servers 16, 16A, 16B, 16C, and 16D store the confirmed IP addresses, and thereafter the IP addresses of the location management server 14 and the information providing servers 15, 15A, 15B, 15C, and 15D corresponding to those confirmed IP addresses are changed, thus allowing the locations of the information providing servers 15, 15A, 15B, 15C, and 15D to be retrieved accurately. Moreover, according to the systems, since the information requesting servers 16, 16A, 16B, 16C, and 16D (information requesting users 19A, 19B, 19C, and 19D) can arbitrarily erase the confirmed IP addresses stored therein, the systems can be coped with it even when the information requesting servers 16, 16A, 16B, 16C, and 16D store the confirmed IP addresses, and thereafter the IP addresses of the location management server 14 and the information providing servers 15, 15A, 15B, 15C, and 15D corresponding to those confirmed IP addresses are changed, thus allowing the locations of the information providing servers 15, 15A, 15B, 15C, and 15D to be retrieved accurately. According to the systems, since provision of the predetermined information to the information requesting servers 16, 16A, 16B, 16C, and 16D is stopped when the presentation times of the ID numbers (identifiers) 22, 23, 27, 28, 29, and 30 to the information requesting servers 16, 16A, 16B, 16C, and 16D exceeds the set time, it can prevent the ID numbers 22, 23, 27, 28, 29, and 30 from unauthorized use by persons other than the identifier holding users 18A, 18B, 18C, and 18D, thus allowing to prevent the information on the identifier holding users 18A, 18B, 18C, and 18D from fraudulently flowing out.

A case of performing the authentication of a visitor in the business partner company and a case of performing the authentication of an entering/leaving person in entering/leaving are illustrated in the identifier authenticating systems shown in FIG. 3 and FIG. 5, but the systems can deal with services other than those two services, and thus the number of services to be dealt with is not limited to two services, but three or more services can be dealt with. Meanwhile, all the information accompanying the authentication exist in the identification information, and thus it is not limited to each identification information including the ID numbers (identifier), the information disclosure levels of the information requesting servers, and the times exemplified in this system. In addition, although three kinds of identification information are exemplified in the identifier authenticating system shown in FIG. 3 and FIG. 5, the identification information is not limited to three kinds, but the identification information may have two or less kinds, or four kinds or more. Moreover, although the pre-registration system and the information providing server authentic method are employed in the system shown in FIG. 3, and the real-time system and the location management server authentic method are employed in the system shown in FIG. 5, the pre-registration system and the location management server authentic method, and the real-time system and the information providing server authentic method may be employed.

The invention claimed is:

1. An identifier authenticating system in which an information providing server that stores predetermined information and an information requesting server that requests the information providing server to provide the predetermined information from each of a plurality of independent private networks, and presents a predetermined identifier to the information requesting server by an identifier holding user having the predetermined identifier given from the information providing server enables providing the predetermined information to the information requesting server from the information providing server, wherein the system comprises a location management server that unifies management of location information of the information providing servers, the predetermined information is stored in those information providing servers, the information requesting server is classified into a plurality of information disclosure levels, wherein in the system, at least one of the following is employed:
a) a pre-registration system where the location management server determines the information disclosure level to the information requesting servers in advance,
b) a real-time system where the location management server determines the information disclosure level to the information requesting servers in real time,
c) a location management server authentic method where the location management server authenticates the information disclosure level of the information requesting servers, or
d) an information providing server authentic method where the information providing servers authenticate the information disclosure level to the information requesting servers based on level certificates held by the identifier holding user, wherein the information providing server specifies the predetermined information by multiplying the identification information formed of at least one identifier and at least one information disclosure level, or specifies the predetermined information by multiplying the identification information formed of at least one identifier, at least one information disclosure level, and the time; and wherein in the system, when the identifier holding user presents the identifier to the information requesting server, the information requesting server asks the location management server about a location of the information providing server, the location management server returns confirmed location information of the information providing server to the information requesting server based on the location information, and the information requesting server uses the confirmed location information to access the information providing server corresponding to the confirmed location information and receives from the accessed information providing server the predetermined information specified by multiplying identification information formed of at least one identifier and at least one information disclosure level, or the predetermined information specified by multiplying identification information formed of at least one identifier, at least one information disclosure level, and the time.

2. The identifier authenticating system according to claim 1, wherein the location management server is divided into a highest first location management server to a lowest k-th location management server, the first to k-th location management servers and the information providing server form a tree structure which branches into a plurality of paths from the first location management server to the k-th location management server and from the k-th location management server toward the information providing server, and the confirmed location information of the information providing server is registered on any one of a plurality of the k-th location management servers; and when the information requesting server asks the first location management server about a location of the information providing server, the first location management server returns confirmed location information of a second location management server immediately lower than that to the information requesting server based on the location information, and when the information requesting server accesses the second location management server corresponding to the returned confirmed location information and asks the accessed second location management server about a location of the information providing server, the second location management server returns confirmed location information of a third location management server immediately lower than that to the information requesting server based on the location information, and the information providing server is retrieved by repeating an inquiry and a response between the location management servers and the information requesting server starting from the first location management server toward the k-th location management server in this manner.

3. The identifier authenticating system according to claim 2, wherein when the confirmed location information of the location management server and the confirmed location information of the information providing server that have been returned based on the retrieval of location in the past are stored in the information requesting server, the identifier authenticating system omits retrieval of the location management servers higher than the location management server that stores the confirmed location information stored in the information requesting server, and when retrieval of the location management servers lower than the location management server immediately lower than the location management server that stores the confirmed location information and the information providing server is needed, it retrieves the information providing server by repeating an inquiry and a response between the location management servers and the information requesting server starting from the location management server immediately lower than the location management server that stores the confirmed location information toward the lower servers.

4. The identifier authenticating system according to claim 3, wherein storage times of the confirmed location information of the location management server and the confirmed location information of the information providing server that have been returned based on the retrieval of location in the past are set in the information requesting server, and when the storage time elapses, the information requesting server erases the stored confirmed location information of the location management server and confirmed location information of the information providing server.

5. The identifier authenticating system according to claim 3, wherein the information requesting server can arbitrarily erase the confirmed location information of the location management server and the confirmed location information of the information providing server which are stored in the information requesting server and have been returned based on the retrieval of location in the past.

6. The identifier authenticating system according to claim 1, wherein, in the system, a presentation-time when the identifier is presented to the information requesting server is transmitted from the information requesting server to the information providing server, and when the information providing server determines that the presentation-time exceeds a set time, it stops providing the predetermined information to the information requesting server.

7. The identifier authenticating system claim 1, wherein the information providing servers, the information requesting servers, and the location management servers are connected with each other through the Internet, and in the system, a series of processes including an inquiry of a location of the information providing server to the location management server, a response of the confirmed location information from the location management server to the information requesting server, a request of predetermined information from the information requesting server to the information providing server, and a provision of predetermined information from the information providing server to the information requesting server are executed through the Internet.

\* \* \* \* \*